United States Patent
Burke et al.

(10) Patent No.: US 9,659,386 B2
(45) Date of Patent: May 23, 2017

(54) METHOD FOR OPERATING A CAMERA ASSEMBLY, CAMERA ASSEMBLY AND DRIVER ASSISTANCE SYSTEM

(71) Applicant: Connaught Electronics Ltd., Tuam, County Galway (IE)

(72) Inventors: Michael Burke, Tuam (IE); Patrick Eoghan Denny, Roscam (IE)

(73) Assignee: Connaught Electronics Ltd., Tuam, County Galway (IE)

( * ) Notice: Subject to any disclaimer, the term of this patent is extended or adjusted under 35 U.S.C. 154(b) by 519 days.

(21) Appl. No.: 14/364,564

(22) PCT Filed: Dec. 7, 2012

(86) PCT No.: PCT/EP2012/074749
§ 371 (c)(1),
(2) Date: Jun. 11, 2014

(87) PCT Pub. No.: WO2013/092247
PCT Pub. Date: Jun. 27, 2013

(65) Prior Publication Data
US 2014/0333757 A1    Nov. 13, 2014

(30) Foreign Application Priority Data

Dec. 24, 2011 (DE) .......................... 10 2011 122 457

(51) Int. Cl.
*G06T 11/00* (2006.01)
*G06T 3/40* (2006.01)
(Continued)

(52) U.S. Cl.
CPC ............ *G06T 11/001* (2013.01); *B60R 1/002* (2013.01); *G06T 3/4038* (2013.01); *G06T 11/00* (2013.01);
(Continued)

(58) Field of Classification Search
CPC ... B60R 1/002; B60R 2300/304; G06T 11/00; G06T 11/001; G06T 11/60;
(Continued)

(56) References Cited

U.S. PATENT DOCUMENTS

2002/0172401 A1* 11/2002 Lees ................... G01V 1/30
                                                                382/109
2003/0069674 A1*  4/2003 Stam ................. B60Q 1/143
                                                                701/36
(Continued)

FOREIGN PATENT DOCUMENTS

DE   10 2006 044 786 A1   3/2008
DE   10 2009 042 476 A1   4/2010
(Continued)

OTHER PUBLICATIONS

International Search Report issued in PCT/JP2012/074749 mailed on Feb. 12, 2013 (3 pages).
(Continued)

*Primary Examiner* — Peter D Le
(74) *Attorney, Agent, or Firm* — Osha Liang LLP

(57) ABSTRACT

The invention relates to a method for operating a camera assembly, in which a first camera and a second camera capture images (36, 42). Respective fields of view of the two cameras overlap at least in a partial region (24). At least in an image (36) captured by the first camera, at least one contamination region (38) including a plurality of pixels is detected within the partial region (24). Thereupon, data values specifying the respective transparency of the pixels in the at least one contamination region (38) are varied with respect to respective reference values of the transparency, wherein these reference values increase in the partial region
(Continued)

Figure 1:
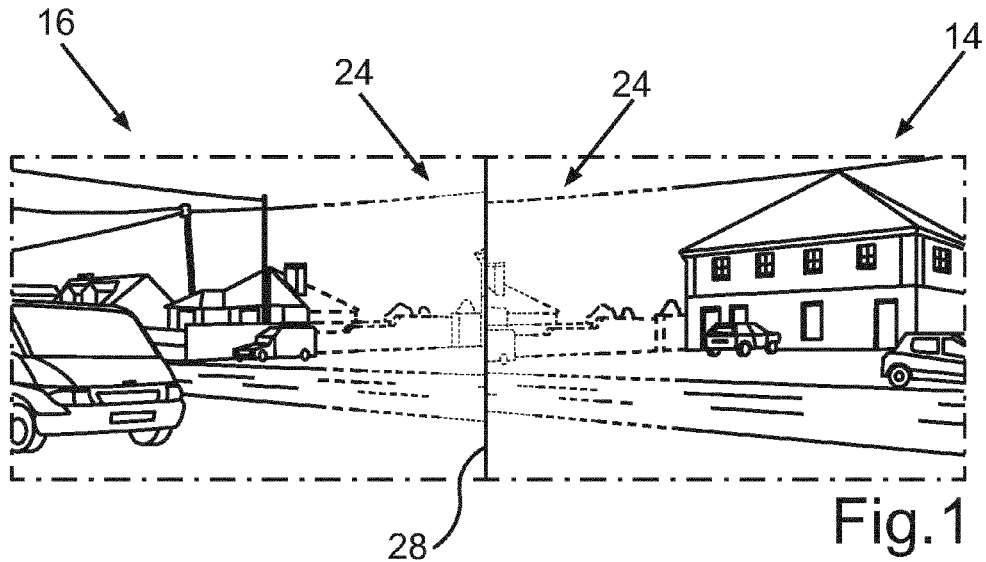

(24) towards an edge (28) of the respective image upon superimposition of the images. Furthermore, the invention relates to a camera assembly.

7 Claims, 2 Drawing Sheets

(51) Int. Cl.
  *B60R 1/00* (2006.01)
  *G06T 11/60* (2006.01)
  *H04N 5/232* (2006.01)
  *H04N 7/18* (2006.01)

(52) U.S. Cl.
  CPC ......... *G06T 11/60* (2013.01); *H04N 5/23229* (2013.01); *H04N 7/181* (2013.01); *B60R 2300/304* (2013.01); *G06T 2207/20221* (2013.01)

(58) Field of Classification Search
  CPC ........ G06T 2207/20221; G06T 3/4038; H04N 5/23229; H04N 7/181
  See application file for complete search history.

(56) References Cited

U.S. PATENT DOCUMENTS

| | | | | |
|---|---|---|---|---|
| 2003/0228052 A1* | 12/2003 | Yamaguchi | ........... | G06T 11/001 382/154 |
| 2005/0001835 A1* | 1/2005 | Miura | ................... | G06T 15/506 345/426 |
| 2005/0237334 A1* | 10/2005 | Chuter | ................... | G06T 15/04 345/581 |
| 2005/0270309 A1* | 12/2005 | Murata | ................... | A63F 13/10 345/632 |
| 2006/0221076 A1* | 10/2006 | Takahashi | ............... | G06T 13/20 345/427 |
| 2007/0019003 A1* | 1/2007 | Imai | ..................... | G09G 3/3611 345/629 |
| 2007/0115357 A1* | 5/2007 | Stein | .................... | B60Q 1/0023 348/148 |
| 2007/0286475 A1* | 12/2007 | Sekiguchi | .......... | G06K 9/00369 382/154 |
| 2008/0165186 A1* | 7/2008 | Lin | ......................... | G06T 15/08 345/419 |
| 2008/0304764 A1* | 12/2008 | Lin | ......................... | G06T 5/005 382/275 |
| 2009/0180682 A1 | 7/2009 | Camus | | |
| 2009/0315723 A1 | 12/2009 | Linsenmaier et al. | | |

FOREIGN PATENT DOCUMENTS

| | | |
|---|---|---|
| EP | 1 418 089 A2 | 5/2004 |
| EP | 1 983 334 A1 | 10/2008 |

OTHER PUBLICATIONS

German Search Report issued in DE 10 2011 122 457.6 mailed on Oct. 10, 2012 (5 pages).

* cited by examiner

METHOD FOR OPERATING A CAMERA ASSEMBLY, CAMERA ASSEMBLY AND DRIVER ASSISTANCE SYSTEM

The invention relates to a method for operating a camera assembly, in which a first camera and a second camera capture images. Respective fields of view of the two cameras overlap at least in a partial region. At least in an image captured by the first camera, at least one contamination region is detected within the partial region, which includes a plurality of pixels. Furthermore, the invention relates to a camera assembly configured to perform the method and to a driver assistance system.

Nowadays, it becomes increasingly usual to use a camera assembly with at least two cameras for a driver assistance system of a vehicle. Thereby, information can be extracted from the environment of the vehicle, which is relevant to the driver. This is in particular true if the entire environment of the vehicle is captured by the at least two cameras. By contaminations on an outer lens of one of the cameras or both cameras, herein, impairments can occur. Namely, such a contamination or soiling can at least partially restrict the field of view of the respective camera. The contamination can for example originate from dirt, water drops or ice on the lens of the respective camera. Such a contamination or soiling then expresses itself in occurrence of a corresponding contamination region in the image captured by the contaminated camera.

In a camera assembly including two cameras, the user sees an overall image, which is composed of the images captured by the two cameras such that the two images overlap in the partial region, in which the fields of view of the cameras coincide. If a contamination region—for instance a stain—is present in the overlapping partial region, thus, it cannot or can only hardly be possible for the user to determine which camera is contaminated. Accordingly, the user can be induced to clean the lenses of both cameras. This is inconvenient for the user.

US 2009/0315723 A1 describes an optical system, which is adapted to detect a contamination of the optical components of the system. Hereto, contrast characteristics within the image captured by a camera are evaluated to determine a variation of the contrast. If a step is identified in the image, where a transition from a stochastic grayscale distribution to a large surface grayscale field with a homogenous, coherent grayscale portion is present, a contamination of a lens of the optical system is assumed.

Comparison with a second image, which was captured by a second image sensor, herein increases the reliability of the decision.

It is the object of the present invention to provide a method as well as a camera assembly of the initially mentioned type, by means of which the presence of a contamination can be met with in a particularly simple manner.

This object is solved by a method, by a camera assembly, and a by driver assistance system in accordance with embodiments described herein.

In the method according to the invention, data values specifying the respective transparency of the pixels in the at least one contamination region, are altered with respect to respective reference values of the transparency in the partial region. Herein, the reference values of the transparency are values specifying the transparency of pixels, which increase towards an edge of the respective image in the partial region. Thus, the reference values correspond to values of the transparency, which are used in the so-called alpha blending. In the alpha blending, two images with an overlapping partial region are superimposed to an overall image, wherein the light transmittance of the pixels increases with increasing approach to the edge of the field of view and thus to the edge of the image captured by the respective camera. If a complete transparency or light transmittance of the pixel exists, thus, a value of •=0 is present in the alpha blending. Correspondingly, a value of •=1 signifies complete light resistance, thus, opacity of the pixel is present. A pixel of the second image disposed behind the opaque pixel of the first image is then no longer perceptible.

Thus, while in the usual superimposition of the two images in the partial region, in which the fields of view of the two cameras overlap, the transparency reference values of the pixels increase in a predetermined and usually continuous manner towards the edge of the respective image, presently, the transparency data values of the respective pixels are altered with respect to these reference values. Thereby, it can be reacted to the presence of a contamination on the lens of at least one of the two cameras. To this, the occurrence of the at least one contamination region is mitigated in a manner that a viewer of the overall image generated from the superimposed images does no longer or hardly perceive the contamination in the partial region. This results in that the user of the camera assembly does not have to laboriously clean the lenses of the at least two cameras in order to eliminate the contamination.

In an advantageous embodiment of the invention, in the image captured by the first camera, the data values specifying the respective transparency of pixels in the at least one contamination region are increased with respect to the respective reference values. In that the respective transparency data value of pixels located in the contamination region is increased, the contamination region is hardly perceptible for a viewer, who views the partial region, in which the two images overlap. Namely, the pixels in the contamination region are then more translucent than it would be the case using the transparency reference values for these pixels.

It has proven further advantageous if in the image captured by the second camera the data values specifying the respective transparency of pixels in an image region superimposed with the at least one contamination region are decreased with respect to the respective reference values. Namely, in the image region of the image captured by the second camera, which is superimposed with the at least one contamination region, there is the complete image information without being impaired by contamination of the lens of the second camera. If the transparency data values are now decreased compared to the transparency reference values, thus, the pixels are more weighted in the image region superimposed with the contamination region. The overall image resulting from superimposition of the individual images then corresponds to the image captured by the second camera to a greater extent in this image region. Thus, in particularly simple manner, information lost by the contamination of the first camera can be recovered by using the image information captured by means of the second camera.

Herein, it has proven advantageous if the data value of a pixel specifying the transparency is increased by an amount in the image captured by the first camera, by which the data value of a pixel superimposed with this pixel is decreased in the image captured by the second camera. Namely, then, transparency is present in the pixel altogether as it would be present in use of the transparency reference values in this pixel. In addition, such a symmetric division of the transparency to the pixels associated with the first image and the second image can be particularly easily implemented in image processing.

It is preferred if the data values specifying the opacity of pixels of the two images superimposed with each other result in the value of 1 in sum on a scale ranging from 0 to 1 in the partial region, in which the image captured by the first camera and the image captured by the second camera overlap. Then, it is ensured that all of the pixels are displayed completely covering, thus non-transparent, in the overlapping partial region of the overall image. This results in a harmonic impression of the overall image also in the partial region, in which the two images are superimposed.

It is further advantageous if the data values specifying the respective transparency of pixels are decreased with respect to the respective reference values in the image captured by the first camera in at least one edge region of the contamination region. Thus, the direct surroundings of the contamination region are then slightly less transparent to light than it would be the case using the transparency reference values. Such image processing is particularly advantageous if there is a very small distance between the contamination on the lens and the image sensor of the camera. In such instances a relatively bright rim can occur around the contamination region, which is less perceptible if the transparency values are altered as described above.

In return, in the image captured by the second camera, in the at least one edge region, the data values are increased with respect to the respective reference values. Thus, the edges around the contamination region are represented slightly more translucent than it would be the case using the transparency reference values in the image not affected by contamination, which the second camera captures. This furthermore results in a particularly smooth transition to the altered transparency data values in the contamination region.

In the detection of the at least one contamination region in the image captured by the first camera, it can be taken into account whether in the image captured by the second camera a structure is present in an image region superimposed with the at least one contamination region, which corresponds to the at least one contamination region. Such a structure corresponding to the contamination region can in particular be present if the shape and/or the size of the structure correspond to the shape and/or the size of the contamination region. In addition or alternatively, it can be provided that image describing parameter values—for example the brightness—have to correspond to each other in the contamination region and in the structure in order to classify the structure as corresponding to the contamination region. Herein, a certain tolerance interval can in particular be considered for the parameter values.

If a structure corresponding to the contamination region is not present in the image captured by the second camera, thus, the region in the image captured by the first camera classified as a contamination region is actually attributable to contamination of the lens of the camera with a particularly great probability. In the reverse case, thus, in the image captured by the second camera there is also a structure corresponding to the at least one contamination region. Thus the probability is decreased that the region in the first image classified as a contamination region is in fact an image region, the appearance of which is causally attributable to a contamination of the lens of the first camera. It is rather to be assumed that the lens of the first camera is not contaminated.

Thus, by considering the image captured by the second camera, the certainty in detection of the contamination region can be increased. This facilitates decision making within the scope of other evaluations of the images captured by the two cameras, which are based on the presence of a contamination region.

Finally, it has proven advantageous if by means of a first evaluation device associated with the first camera, it is checked whether at least one contamination region is present in the image captured by the first camera, and by means of a second evaluation device associated with the second camera, this inspection is performed for the image captured by the second camera. This facilitates the association of the contamination region with the image captured by the respective camera. Also, the cameras can check the presence of contamination on their respective lenses independently, and a soiling detection algorithm particularly well adapted for the respective camera can be utilized.

The camera assembly according to the invention, which is in particular provided for application in a vehicle, includes a first camera and a second camera, by means of which respective images can be captured. Respective fields of view of the two cameras overlap at least in a partial region. The camera assembly includes at least one evaluation device, by means of which at least in an image captured by the first camera at least one contamination region can be detected within the partial region, wherein the contamination region includes a plurality of pixels. Furthermore, the camera assembly includes an image processing device, by means of which data values specifying the respective transparency of the pixels in the at least one contamination region are alterable in the partial region with respect to respective reference values, which increase towards an edge of the respective image upon superimposing the images. With such a camera assembly, the presence of a contamination can be met with in a particularly simple manner. Then, the contamination is hardly or no longer perceptible for a viewer of an overall image including the images overlapping in the partial region.

The preferred embodiments presented with respect to the method for operating a camera assembly and the advantages thereof correspondingly apply to the camera assembly and/or the driver assistance system according to the invention and vice versa. A vehicle according to the invention may be equipped with the camera assembly and/or the driver assistance system.

The features and feature combinations mentioned above in the description as well as the features and feature combinations mentioned below in the description of figures and/or shown in the figures alone are usable not only in the respectively specified combination, but also in other combinations or alone without departing from the scope of the invention.

Figure 2:
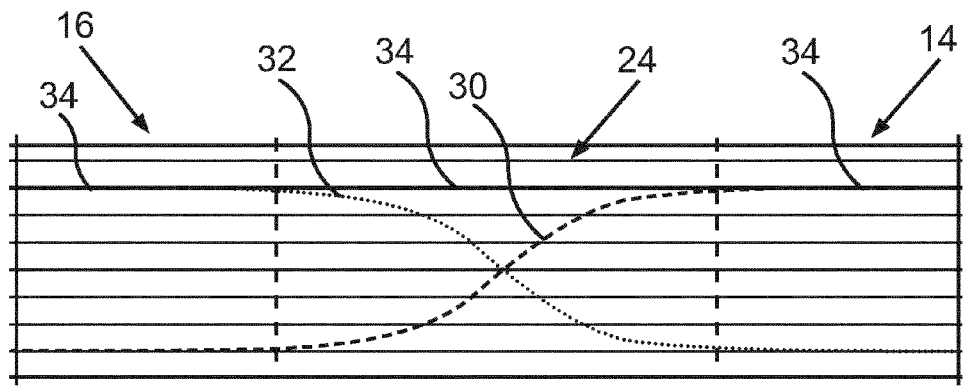
Figure 3:
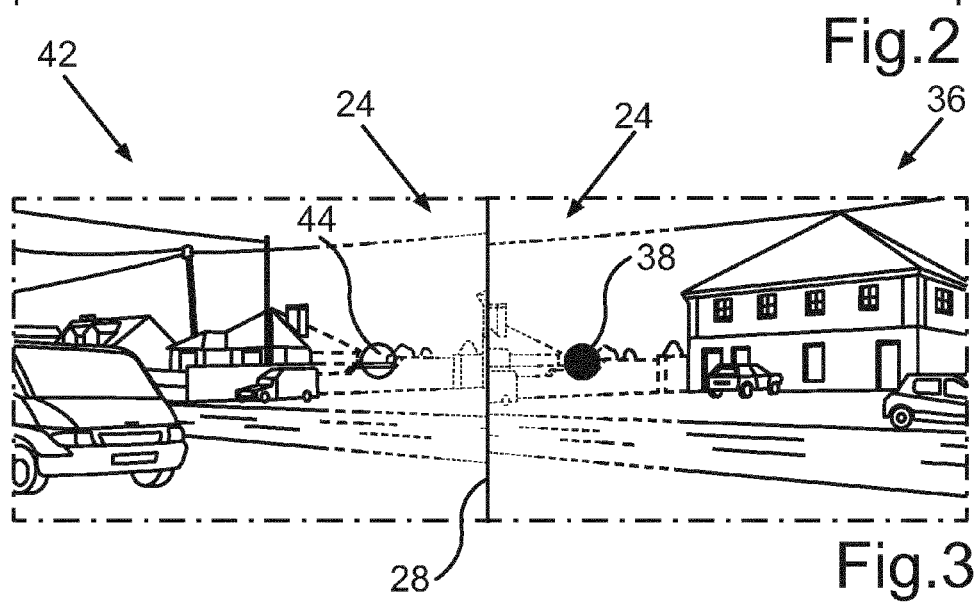
Figure 4:
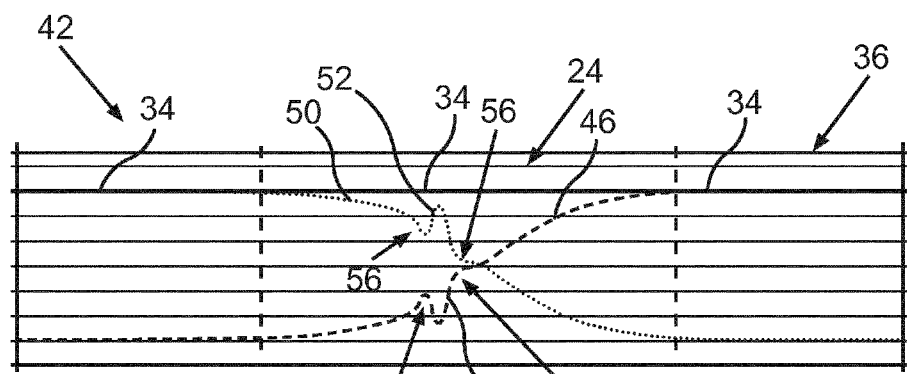
Figure 5:
Figure 6:
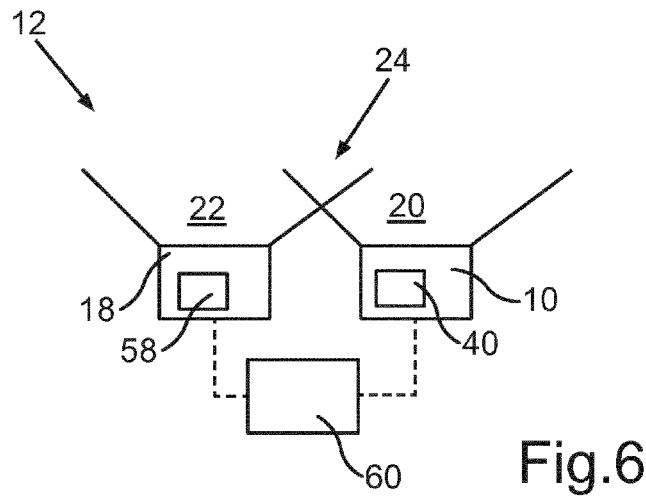

Further advantages, features and details of the invention are apparent from the claims, the following description of preferred embodiments as well as based on the drawings, in which identical or functionally identical elements are provided with identical reference characters. Therein show:

FIG. 1 two images captured by a respective camera of a camera assembly, which are superimposed to an overall image, wherein edge partial regions of the two images overlap with each other in the overall image and wherein in the respective image the transparency of the pixels decreases towards the edge of the overlapping partial region;

FIG. 2 a graph, in which two curves indicating reference values for the transparency of pixels, illustrate the decrease of them in the overlapping partial region towards the edge of the image captured by the respective camera according to FIG. 1;

FIG. 3 the individual images to be superimposed to an overall image in a situation, in which a contamination is present on the lens of one of the two cameras, which is perceptible as a contamination region in the image captured by this camera;

FIG. 4 curves illustrating the variation of the transparency data values with respect to the reference values shown in FIG. 2, wherein in the image captured by the contaminated camera the transparency is increased in the contamination region and in the image captured by the other camera in the same region the transparency is decreased to the same extent;

FIG. 5 the overall image composed of the two individual images overlapping in the partial region according to FIG. 3, in which the contamination is no longer perceptible; and FIG. 6 highly schematized a camera assembly including the two cameras, and which is configured to output the overall image shown in FIG. 5.

FIG. 1 shows a first image 14 captured by a first camera 10 of a camera assembly 12 (cf. FIG. 6). A second image 16 is captured by a second camera 18 of the camera assembly 12. For example, the camera assembly 12 is provided for a vehicle and serves for environment observation of the vehicle. Herein, the camera assembly 12 can in particular be a component of a driver assistance system, wherein an output of the camera assembly 12 is utilized by a functional unit of the driver assistance system.

The two cameras 10, 18 have respective fields of view 20, 22 (cf. FIG. 6), which overlap in a partial region 24. Accordingly, in this partial region 24, the first image 14 corresponds to the second image 16. The two images 14, 16 are composed to an overall image 26 (cf. FIG. 5), in which the two images 14, 16 overlie each other in the partial region 24. Herein, the images 14, 16 shown in FIG. 1 are already processed for the creation of the overall image 26 such that the transparency of the pixels in the partial region 24 decreases towards an edge 28 of the respective image 14, 16.

From FIG. 2, the increase of the transparency of the pixels of the first image 14 towards its edge 28 is apparent from a first curve 30, wherein the increase is equivalent to the decrease of the opacity of the pixels of this first image 14 in the partial region 24. In analogous manner, the increase of the transparency of the pixels of the first image 16 in the overlapping partial region 24 is illustrated by a further curve 32. This type of superimposition of the two images 14, 16 in the overlapping partial region 24 is also referred to as alpha blending, since the alpha value of an image point or pixel indicates a measure of the transparency or opacity of the respective pixel.

Herein, an alpha value of 0 signifies complete transparency, in which the pixel becomes invisible. In contrast, an alpha value of 1 signifies complete light resistance or opacity of the pixel. A pixel having an alpha value of 1 thus covers a pixel located behind it. Herein, for a pixel in the overall image 26 defined by the coordinates X and Y in the partial region 24, it applies:

$$P(X,Y) = \alpha(X,Y)Pcam1(X,Y) + (1-\alpha(X,Y))Pcam2(X,Y),$$

wherein •(X,Y)Pcam1(X,Y) indicates the transparency of a pixel captured by the first camera 10 and (1−•(X,Y))Pcam2 (X,Y) indicates the transparency of the pixel captured by the second camera 18 at this point of the partial region 24.

As is apparent from FIG. 2, in the usual alpha blending, the pixels in the image 14 captured by the first camera 10 are faded out to the extent that the pixels are faded in within the image 16 captured by the second camera 18. In FIG. 2, in addition, the opacity of the overall image 26 (cf. FIG. 5) is represented by a line 34.

By the curves 30, 32, reference values of the transparency are defined, which are used for determining the transparency for the individual pixels in the partial region 24, if none of the two cameras 10, 18 has a contamination or soiling on the respective lens.

Based on FIG. 3, now, a situation is illustrated, in which the lens of the first camera 10 is contaminated in a location, for instance because dirt, a water drop or ice is present in this location. Such a contamination entails the occurrence of a contamination region 38 in an image 36 captured by the first camera 10, which is presently located in the partial region 24. The presence of this contamination region 38 is determined by means of an evaluation device 40 associated with the first camera 10 (cf. FIG. 6).

In contrast, in an image 42 captured by the second camera 18, impairment of the image information does not occur in an image region 44 superimposed with the contamination region 38, since the lens of the second camera 18 is not contaminated.

Since both cameras 10, 18 capture a complete image in the overlapping partial region 24 of their fields of view 20, 22, if there is no contamination present on the lens, presently, the image information lost in the contamination region 38 is compensated for by the image information present in the image region 44. To this, it is deviated from the reference values of the transparency illustrated by the curves 30, 32 in the partial region 24 in alpha blending. How this is effected is apparent from FIG. 4.

In FIG. 4, a curve 46 illustrates the transparency of the pixels in the partial region 24 of the image 36 captured by the first camera 10. Correspondingly, in the contamination region 38 a decline 48 or dip in the curve 46 occurs. This decline 48 means an increase of the transparency in the contamination region 38 or a decrease of the opacity of the pixels in this contamination region 38. The variation of the transparency data values according to the curve 46 in the region of the decline 48 herein relates to the curve 30 in FIG. 2, which indicates the transparency reference values.

This loss of information in the image 36 is compensated for by a decrease of the transparency or an increase of the opacity in the image region 44, which inevitably is also located within the partial region 24 in the image 42 captured by the second camera 18. This local increase of the opacity—related to the transparency reference values according to the curve 32 in FIG. 2—in the partial region 44 is illustrated in a curve 50 indicating the progress of the transparency in the partial region 24 for the image 42 captured by the second camera 18, by a spike or peak 52. Thus, in the region of this peak 52, there is decreased transparency or increased opacity with respect to the reference values of the curve 32 (cf. FIG. 2).

Presently, the decline 48 and the peak 52 are symmetrical with respect to an imagined horizontal line extending parallel to the line 34. In other words, in the region of the decline 48, the transparency is increased to the extent that it is decreased in the region of the peak 52. Thereby, the data values of the transparency, which are indicated by the curves 46, 50, always complement each other to the value of 1 in sum, which is also illustrated by the line 34.

Thus, the image 42 captured by the second camera 18 is processed concerning the transparency of the individual pixels such that it compensates for the loss of image information in the image 36 captured by the first camera 10. This loss is caused by decrease of the transparency of the pixels in the contamination region 38.

At respective edges of the contamination region 38, the data values specifying the respective transparency of pixels in the region of the edge are decreased with respect to the respective reference values. This expresses itself in local elevations 54 in the curve 46 opposite to the direction of the decline 48. In analogous manner, the transparency data values are increased with respect to the respective reference values in the edge regions of the image region 44. This expresses itself in local depressions 56 in the curve 50, which are respectively formed on both sides next to the peak 52. These local elevations 54 and depressions 56 are optional only and may be preferred if there is a very small distance between the spot or contamination on the lens of the first camera 10 and the image sensor of that camera 10. Recovering the image information lost in the image 36 captured by the first camera 10 by the image information from the image 42 captured by the second camera 18 can also be done if only the decline 48 and the peak 52 are present.

The result of superimposition of the two images 36, 42, in which the transparency is increased in the contamination region 38 and in reverse decreased in the image region 44 corresponding to the contamination region 38, is illustrated in the overall image 26 shown in FIG. 5. Accordingly, the contamination region 38 is not perceptible in the overall image 26, but the overall image 26 shows the image information primarily originating from the second image 42 at this location.

The evaluation of the two images 36, 42 captured by the respective camera 10, 18 can advantageously also be used for determining whether there is a contamination region 38 in the partial region 24 at all. To this, by means of an algorithm, it is first checked by the evaluation device 40 if such a structure interpretable as a contamination region 38 is present in the partial region 24 of the image 36, in which a sudden change of parameters of the image 36 exists. In addition, it is checked if such a structure is also present in the corresponding image region 44 in the image 42 captured by the second camera 18. If this is not the case, thus, if there is no structure corresponding to the contamination region 38 with respect to the image characteristics in the image region 44, this suggests that the contamination region 38 was correctly classified as based on a contamination of the lens of the first camera 10.

In the opposite case, in which both in the image region in the image 36 classified first as contamination region 38 and in the image region 44 in the image 42 corresponding to it similar structures are present, it can be concluded that in the image region in the image 36 the presence of a contamination region 38 has erroneously been identified.

As is apparent from FIG. 6, the first camera 10 of the camera assembly 12 has an own evaluation device 40, which is designed for detecting a contamination region 38 in the image 36 captured by the first camera 10. The second camera 18 also has such an evaluation device 58, by means of which the presence of a contamination region is checked for in images captured by means of this camera 18.

Furthermore, the camera assembly 12 includes an image processing device 60 configured to alter the data values specifying the transparency of the pixels in the partial region 24 with respect to the reference values illustrated in FIG. 2 based on the curves 30, 32 upon detection of a contamination region 38 in the image 36, 42 captured by one of the two cameras 10, 18. These data values of the transparency altered by the image processing device 60 are illustrated in FIG. 4 by the curves 46, 50. Thereby, the camera assembly 12 is configured to mitigate the effects of contaminations or soiling on the lens of one of the two cameras 10, 18 in the manner that a contamination is not perceptible for the viewer of the overall image 26 in the partial region 24.

The camera assembly 12 can also include more than the presently exemplarily shown two cameras 10, 18 as long as the fields of view of the cameras overlap at least in regions. The mitigation of soiling of a lens of one of these cameras in the overlapping region herein makes use of the presently described special type of alpha blending in the overlapping partial region 24. Namely, the alpha blending is performed such that the information provided by the camera 18 not affected by contamination in the image region 44 is more weighted. In contrast, the information provided by the camera 10 affected by contamination in the contamination region 38 is less weighted. With these different weightings of the image information, the images 36, 42 are then composed to the overall image 26.

The invention claimed is:

1. A method for operating a camera assembly for a vehicle, in which a first camera and a second camera capture images, wherein respective fields of view of the two cameras overlap at least in a partial region, and in which at least in an image captured by the first camera at least one contamination region including a plurality of pixels is detected within the partial region, the method comprising:
    altering data values specifying the respective transparency of the pixels in the at least one contamination region with respect to respective reference values of the transparency, which increase in the partial region towards an edge of the respective image upon superimposition of the images,
    wherein in the image captured by the second camera, the data values specifying the respective transparency of pixels in an image region superimposed with the at least one contamination region are decreased with respect to the respective reference values, and
    wherein that the data value of a pixel specifying the transparency in the image captured by the first camera is increased by an amount, by which the data value of a pixel superimposed with this pixel in the image captured by the second camera is decreased.

2. The method according to claim 1, wherein in the partial region, in which the image captured by the first camera and the image captured by the second camera overlap, the data values specifying the opacity of pixels of the two images superimposed with each other result in a value of 1 in sum on a scale ranging from zero to 1.

3. The method according to claim 1, wherein in the image captured by the first camera, in at least one edge region of the contamination region, the data values specifying the respective transparency of pixels are decreased with respect to the respective reference values, wherein in the image captured by the second camera, in the at least one edge region, the data values are increased with respect to the respective reference values.

4. The method according to claim 1, wherein in the detection of the at least one contamination region in the image captured by the first camera, it is taken into account whether in the image captured by the second camera a structure corresponding to the at least one contamination region is present in an image region superimposed with the at least one contamination region.

5. The method according to claim 1, further comprising means of an evaluation device associated with the respective camera, it is checked whether the at least one contamination region is present in the image captured by the first camera and in the image captured by the second camera.

6. A camera assembly, for a vehicle, comprising
   a first camera; and
   a second camera for capturing respective images,
   wherein respective fields of view of the two cameras overlap at least in a partial region, and
including
   at least one evaluation device, by means of which at least in an image captured by the first camera at least one contamination region including a plurality of pixels is detectable within the partial region,
   wherein the camera assembly includes an image processing device, by means of which data values specifying the respective transparency of the pixels in the at least one contamination region are alterable with respect to respective reference values increasing towards an edge of the respective image upon superimposition of the images in the partial region,
   wherein in the respective image captured by the second camera, the data values specifying the respective transparency of pixels in an image region superimposed with the at least one contamination region are decreased with respect to the respective reference values, and
   wherein that the data value of a pixel specifying the transparency in the image captured by the first camera is increased by an amount, by which the data value of a pixel superimposed with this pixel in the image captured by the second camera is decreased.

7. The driver assistance system with a camera assembly according to claim 6, wherein an output of the camera assembly is utilizable by at least one functional unit of the driver assistance system.

\* \* \* \* \*